United States Patent
Yasuda

(10) Patent No.: US 12,185,707 B2
(45) Date of Patent: Jan. 7, 2025

(54) BRAKING FORCE CONTROL DEVICE AND FISHING REEL PROVIDED WITH THE SAME

(71) Applicant: GLOBERIDE, INC., Higashi Kurume (JP)

(72) Inventor: Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/509,842

(22) Filed: Nov. 15, 2023

(65) Prior Publication Data
US 2024/0090484 A1 Mar. 21, 2024

Related U.S. Application Data

(63) Continuation of application No. 17/884,312, filed on Aug. 9, 2022, now Pat. No. 11,849,712.

(30) Foreign Application Priority Data

Aug. 20, 2021 (JP) .................................. 2021-134999

(51) Int. Cl.
  *A01K 89/01* (2006.01)
  *A01K 89/0155* (2006.01)
  *A01K 89/033* (2006.01)
(52) U.S. Cl.
  CPC ...... *A01K 89/033* (2013.01); *A01K 89/01555* (2013.01)
(58) Field of Classification Search
  CPC .................... A01K 89/01555; A01K 89/033
  See application file for complete search history.

(56) References Cited

U.S. PATENT DOCUMENTS

| | | | |
|---|---|---|---|
| 4,779,814 A | 10/1988 | Uetsuki et al. | |
| 5,692,693 A | 12/1997 | Yamaguchi | |
| 6,045,076 A | 4/2000 | Daniels | |
| 9,101,121 B2 * | 8/2015 | Niitsuma | ......... A01K 89/01555 |
| 2004/0148843 A1 | 8/2004 | Ikuta et al. | |

(Continued)

FOREIGN PATENT DOCUMENTS

| | | | | |
|---|---|---|---|---|
| EP | 2721925 A1 * | 4/2014 | ....... | A01K 89/01555 |
| JP | S63-023975 U | 2/1988 | | |

(Continued)

OTHER PUBLICATIONS

Mar. 12, 2024 Office Action issued in Japanese Patent Application No. 2021-134999.

(Continued)

*Primary Examiner* — Emmanuel M Marcelo
(74) *Attorney, Agent, or Firm* — Oliff PLC

(57) ABSTRACT

A braking force control device according to one embodiment of the present disclosure is a braking force control device provided with a spool pivotally supported by a reel body, the spool on which a fishing line may be wound, a rotational speed detection unit that detects a rotational speed of the spool, a braking unit that generates a braking force to the spool, and a braking force control unit that controls the braking force of the braking unit, in which the braking force control unit adjusts the braking force according to elapsed time from when casting starts or detection information of the rotational speed detection unit.

6 Claims, 11 Drawing Sheets

(56) References Cited

U.S. PATENT DOCUMENTS

| | | | |
|---|---|---|---|
| 2009/0026300 A1 | 1/2009 | Tsutsumi | |
| 2013/0306777 A1 | 11/2013 | Ikebukuro | |
| 2016/0037759 A1 | 2/2016 | Ikebukuro | |
| 2017/0172130 A1* | 6/2017 | Komemushi | G01P 3/487 |
| 2017/0208785 A1* | 7/2017 | Ishikawa | A01K 89/0155 |
| 2019/0223421 A1* | 7/2019 | Niitsuma | A01K 89/0192 |
| 2020/0165109 A1 | 5/2020 | Niitsuma | |

FOREIGN PATENT DOCUMENTS

| | | | | |
|---|---|---|---|---|
| JP | 2004-208630 A | | 7/2004 | |
| JP | 2016136893 A | | 8/2016 | |
| JP | 2017-175933 A | | 10/2017 | |
| JP | 2019-126270 A | | 8/2019 | |
| JP | 2020-080766 A | | 6/2020 | |
| KR | 20060083907 A | * | 7/2006 | A01K 89/01555 |

OTHER PUBLICATIONS

Extended Search Report for related European Application No. 22187641.0; action dated Jan. 20, 2023; (10 pages).

Sep. 29, 2024 Notice of Preliminary Rejection issued in Korean Application No. 10-2022-0102555.

* cited by examiner

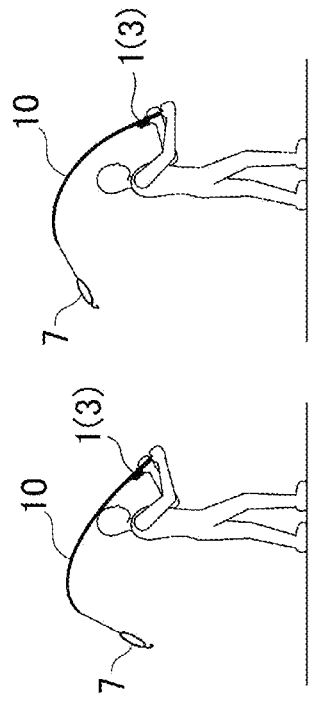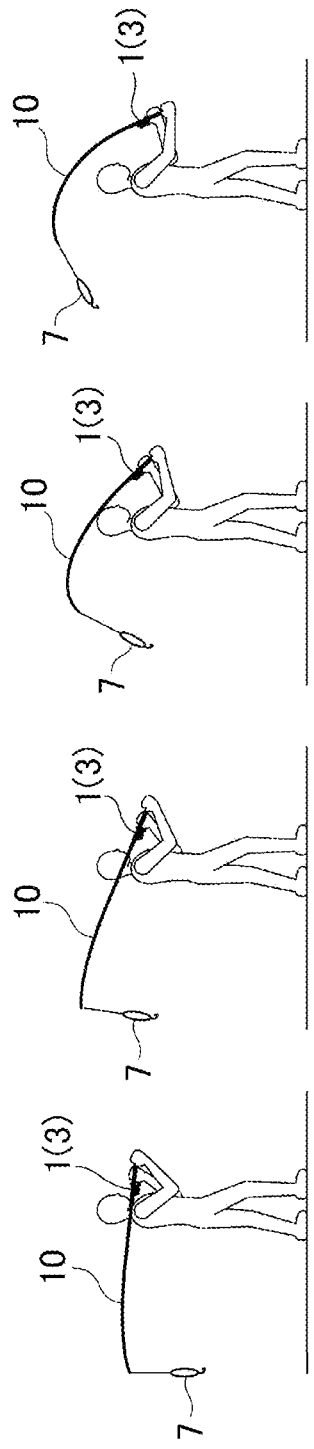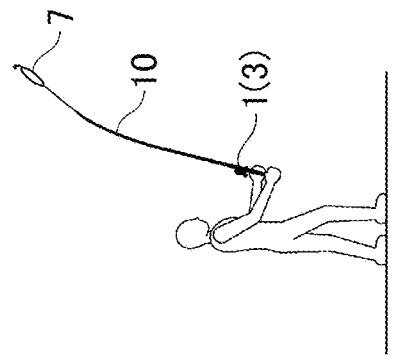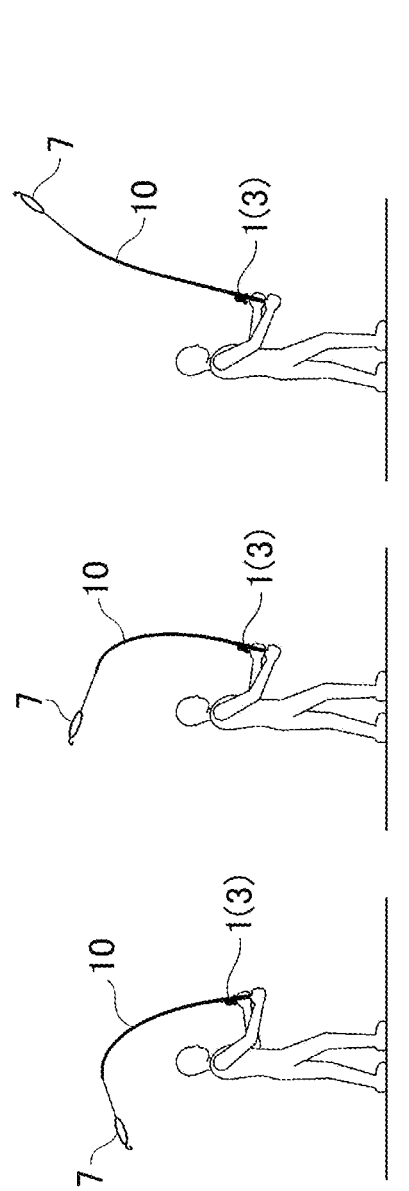

BRAKING FORCE CONTROL DEVICE AND FISHING REEL PROVIDED WITH THE SAME

CROSS-REFERENCE TO RELATED APPLICATIONS

This application is a Continuation of application Ser. No. 17/884,312 filed Aug. 9, 2022. This application also claims priority under 35 U.S.C. § 119 to Japanese Patent Application No. 2021-134999 filed on Aug. 20, 2021, in the Japanese Patent Office. The entire contents of these prior-filed applications are incorporated by reference herein.

FIELD

The present disclosure relates to a braking force control device, especially a braking force control device of a double bearing reel that brakes a spool rotatably mounted on a reel body, and a fishing reel provided with the same.

BACKGROUND

A braking device that brakes a spool for preventing backlash at the time of casting is provided on a double bearing reel, especially a bait casting reel in which a lure and the like is mounted on a tip of a fishing line for casting (throwing). As such braking device, there is known an electrically controlled braking device in which a power generation mechanism is provided between the spool and a reel body, and a braking force during casting may be adjusted by electrically controlling the same.

SUMMARY

In a braking device according to JP 2004-208630 A, it is assumed that tension and angular acceleration are proportional to each other, and feedback control is performed such that the angular acceleration remains within a target range by switching a short circuit or opening of the braking device while constantly monitoring the angular acceleration.

In this method, the angular acceleration of the spool needs to be detected. In order to detect the angular acceleration of the spool, for example, there is a method in which an incremental encoder is formed of two photosensors and the like, an angle of the spool is obtained, and then the angle is differentiated twice with respect to time to obtain the angular acceleration, and a method in which a magnet is provided on the spool and a coil is provided on the reel body, thereby obtaining the angular acceleration by detecting a counter electromotive force proportional to rotation of the spool, and then differentiating the angular speed once with respect to time to obtain the angular acceleration.

However, in the former method, there is a problem that, when the angle is differentiated twice, it is easy to be affected by noise and it is difficult to perform control with required accuracy. In the latter method, there is a problem that it is necessary to provide the magnet on the spool, and there is a limit in reducing inertia of the spool.

Since a feedback loop for constantly monitoring the angular acceleration is formed in the first place, there also is a problem that an influence of oscillation is easily received depending on conditions, and a calculation load of a microcomputer becomes high.

The present disclosure is achieved in view of the above-described circumstances, and an object thereof is to provide a braking force control device capable of achieving both backlash prevention and flying distance improvement without monitoring acceleration and a fishing reel provided with the same. Other objects of the present disclosure will become apparent by reference to the entire specification.

A braking force control device according to one embodiment of the present disclosure is a braking force control device provided with a spool pivotally supported by a reel body, the spool on which a fishing line may be wound, a rotational speed detection unit that detects a rotational speed of the spool, a braking unit that generates a braking force to the spool, and a braking force control unit that controls the braking force of the braking unit, in which the braking force control unit adjusts the braking force according to elapsed time from when casting (throwing) starts or detection information of the rotational speed detection unit.

In the braking force control device according to one embodiment of the present disclosure, the braking force control unit controls the braking force on the basis of a brake set value defined for each time during first time of casting, and controls the braking force on the basis of a brake set value defined on the basis of the rotational speed of the spool during second time of the casting.

In the braking force control device according to one embodiment of the present disclosure, the brake set value of the first time of the casting and the brake set value of the second time of the casting may be individually set and changed.

In the braking force control device according to one embodiment of the present disclosure, the braking unit generates the braking force that increases in proportion to an angular speed of the spool, and the braking force control unit controls a proportional coefficient in a changeable manner.

In the braking force control device according to one embodiment of the present disclosure, the braking unit is provided with a conductive member provided on the spool, a magnetic force generation unit provided on the reel body, and a magnetic field adjustment unit that changes a magnetic field state of the magnetic force generation unit.

In the braking force control device according to one embodiment of the present disclosure, the conductive member is an induct rotor, the magnetic force generation unit is a permanent magnet, and the magnetic field adjustment unit is a motor and a decelerator.

In the braking force control device according to one embodiment of the present disclosure, the braking force control unit controls such that intensity of a magnetic field acting on the conductive member is proportional to the rotational speed of the spool.

In the braking force control device according to one embodiment of the present disclosure, the braking unit is provided with a brake plate provided on the spool and magneto-rheological fluid in contact with the brake plate, and the braking force control unit is provided with a magnetic field adjustment unit that adjusts a magnetic field acting on the magneto-rheological fluid.

A fishing reel according to one embodiment of the present disclosure includes any of the braking force control device described above.

According to the above-described embodiment, it becomes possible to provide a braking force control device capable of achieving both backlash prevention and flying distance improvement without monitoring acceleration, and a fishing reel provided with the same.

BRIEF DESCRIPTION OF THE DRAWINGS

FIGS. 1A to 1G are views illustrating an example of a procedure of casting and retrieving a fishing tool such as a lure using a fishing reel;

DETAILED DESCRIPTION

Hereinafter, an embodiment of a braking force control device and a fishing reel provided with the same according to the present disclosure is specifically described with reference to the accompanying drawings. Components common in a plurality of drawings are assigned with the same reference signs throughout the plurality of drawings. Note that, the drawings are not necessarily drawn to scale for convenience of description.

First, an example of a procedure of casting (throwing) and retrieving a fishing tool such as a lure using a general fishing reel 1 including this reel is described with reference to FIGS. 1A to 1G and 2. First, as illustrated in FIG. 1A, a lure 7 is adjusted to be at a predetermined length from a rod tip of a fishing rod 10, and a clutch is turned off to set to a spool free state. At that time, a spool 3 of the fishing reel 1 is pressed with a thumb so that a fishing line does not go out due to a weight of the lure itself and the like.

Next, as illustrated in FIGS. 1B to 1D, the fishing rod 10 is swung to give an initial speed to the lure 7. Then, as illustrated in FIG. 1E, when the thumb is released from the spool 3 at a timing when a speed and a releasing direction of the lure 7 become appropriate, the lure 7 may be thrown.

Furthermore, after the casting (throwing), the lure 7 starts decelerating by receiving tension from the fishing line and air resistance after FIG. 1G. In contrast, the spool 3 starts rotating due to the tension from the fishing line. When a releasing speed of the fishing line coincides with a flying speed of the lure 7, the spool 3 reaches a maximum rotational speed, and the fishing line loses the tension. The lure 7 continues stalling due to the air resistance and the like also after that. At that time, when the spool 3 continues rotating at a high speed due to inertia, the releasing speed of the fishing line exceeds the flying speed of the lure 7. As a result, the fishing line is released in excess, and entanglement of the line occurs in the fishing reel 1. In order to avoid this, a predetermined braking force may be applied to the spool 3 by a braking device.

Figure 2:
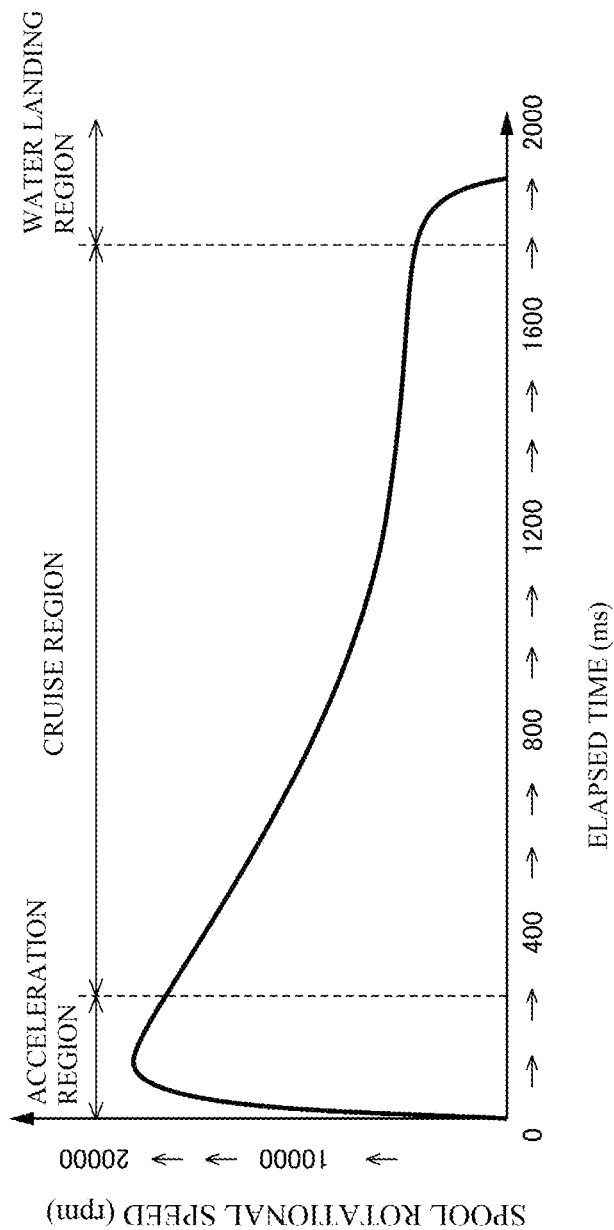
FIG. 2 is a view illustrating a transition of a spool rotational speed when casting and retrieving the fishing tool such as the lure using the fishing reel.

FIG. 2 illustrates a change in time of a spool speed. Elapsed time from when the spool starts rotating is plotted along the abscissa, and a rotational speed of the spool is plotted along the ordinate. As illustrated in FIG. 2, the spool 3 drastically accelerates from when the casting starts to reach its maximum speed. The maximum rotational speed is about 6,000 rpm to 40,000 rpm depending on a type of the lure 7 to be thrown, a target distance, a difference in diameter of the line wound on the spool and the like, and time to reach the maximum speed is about 70 ms to 150 ms. In one embodiment of the present disclosure, this region is referred to as an acceleration region.

Thereafter, when a sufficient length of line is released, the lure 7 is no longer affected by an operation of the fishing rod 10, and an influence of the air resistance becomes dominant, so that the lure speed is gradually reduced. In one embodiment of the present disclosure, this region is referred to as a cruise region. A boundary between the acceleration region and the cruise region often comes after a lapse of about 100 ms to 400 ms from when the spool starts rotating. Thereafter, when altitude of the lure 7 is sufficiently lowered, the lure 7 lands on the water, and the lure speed is drastically reduced. In one embodiment of the present disclosure, this region is referred to as a water landing region.

In each region, when the braking force by the braking device is too large, a distance to which the lure 7 may be thrown becomes short. In contrast, when the braking force by the braking device is too small, the entanglement of the line occurs, and it becomes difficult to wind and release normally. An appropriate value of the braking force might change depending on a mass of the lure 7 and the air resistance. Furthermore, the appropriate value of the braking force might change depending on various influences such as a length of the fishing rod 10, a manner of casting, and a natural environment such as wind.

Figure 3:
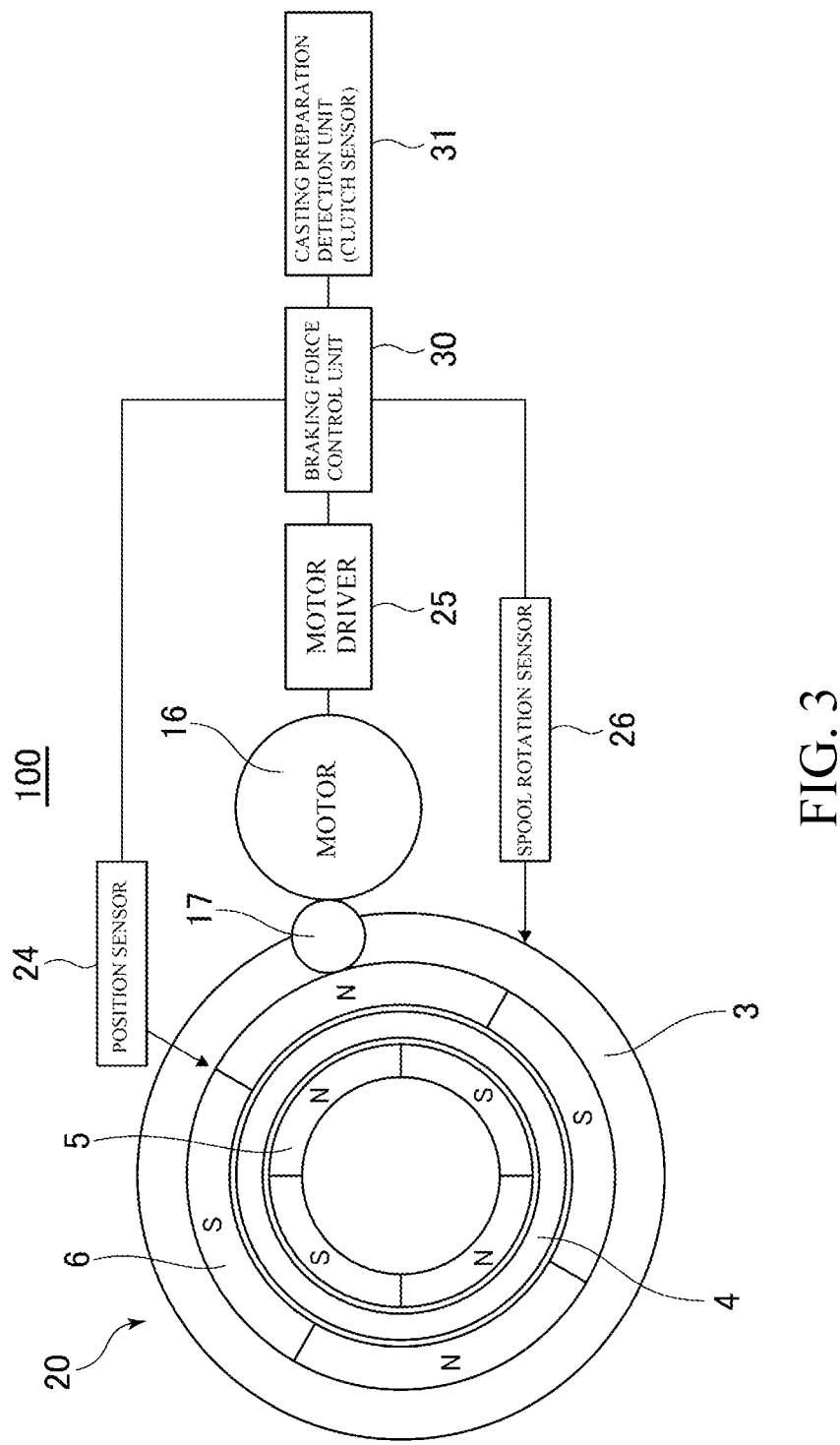
FIG. 3 is a view for illustrating a configuration of the fishing reel including a braking force control device according to one embodiment of the present disclosure.
Figure 4:
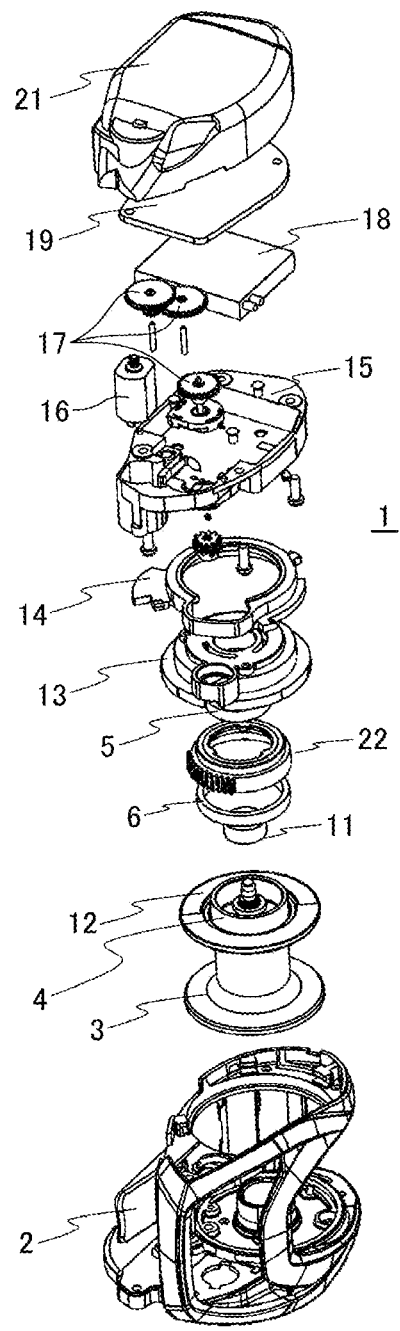
FIG. 4 is a view for illustrating a configuration of the fishing reel including the braking force control device according to one embodiment of the present disclosure.
Figure 5:
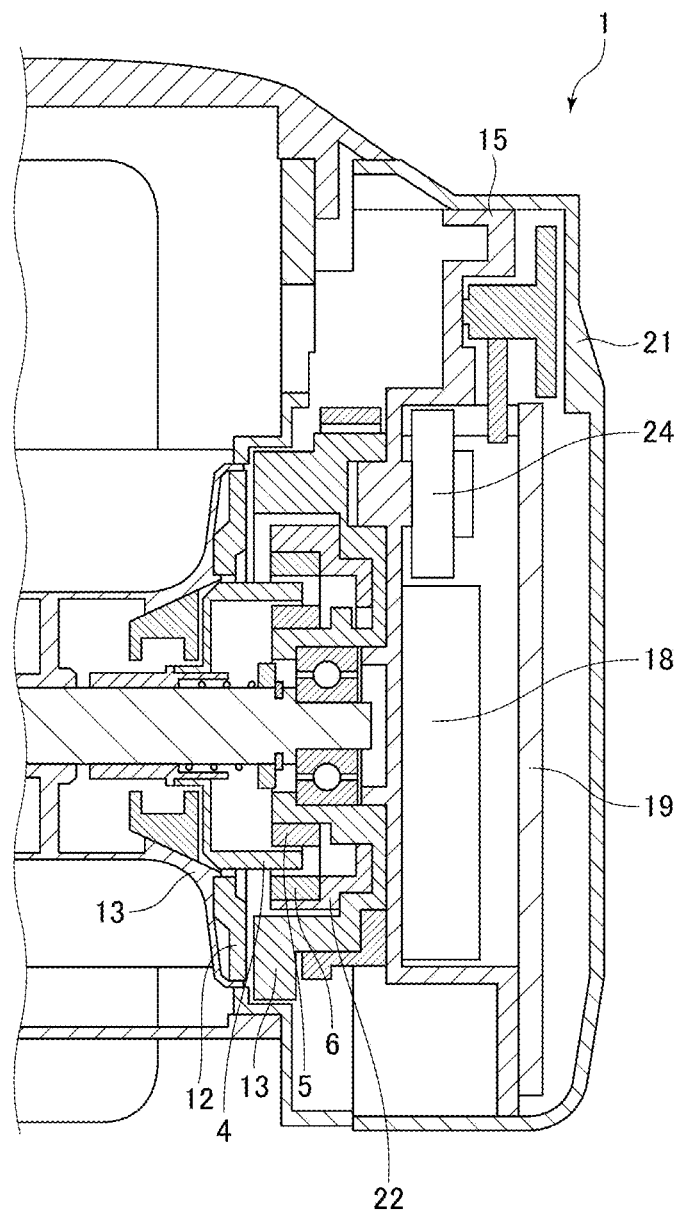
FIG. 5 is a view for illustrating a configuration of the fishing reel including the braking force control device according to one embodiment of the present disclosure.

Next, a part configuration of the fishing reel 1 to which a braking force control device 100 according to one embodiment of the present disclosure is attached is described with reference to FIGS. 3 to 5. FIG. 3 is a system diagram illustrating a configuration of the braking force control device 100 according to one embodiment of the present disclosure. FIG. 4 is an exploded perspective view illustrating a part configuration of the braking force control device 100 according to one embodiment of the present disclosure. FIG. 5 is a cross-sectional view of the braking force control device 100 according to one embodiment of the present disclosure after assembly.

The fishing reel 1 according to one embodiment of the present disclosure is formed of a frame 2 forming a reel body, the spool 3, a braked member (induct rotor) 4, a bearing 11, a reflector 12, a fixed magnet 5, a rotating magnet 6, a set plate 13, a lock member 14, an inner lid 15, a motor 16, a reduction gear 17, a battery 18, a board 19, and an outer lid 21. Note that, in order to simplify the description, some known functions of the reel body are omitted.

The spool 3 is formed into a substantially cylindrical shape, and may wind the fishing line on an outer periphery thereof when being rotated forward. One of a pair of bearings 11 that rotationally supports the spool 3 is fixed to the frame (reel body) 2, and the other is fixed to the set plate 13.

Herein, the frame (reel body) 2 may be attached to the fishing rod, and the fishing reel 1 includes an operation means (handle) not illustrated as is the case with a conventional fishing reel and may wind the fishing line when the spool 3 is rotated in a forward direction by a user operation. Rotation of the handle (not illustrated) is transmitted to the spool 3 by a transmission means such as a gear. The fishing reel 1 includes a clutch means (not illustrated), and a user may select connection and disconnection of power transmission to the spool 3 by operating the clutch means. In a connected state, winding by the operation means is possible. In a disconnected state, the spool 3 may be freely rotated in forward and backward directions, and the fishing line may be released.

The fishing reel 1 may also be provided with a drag means that prevents breakage of the fishing line by idling the spool 3 when torque of a predetermined value or larger is applied, and a reverse rotation prevention means that prevents reverse rotation of the handle. Furthermore, an oscillator device that uniformly winds the fishing line by reciprocating a position of a guide unit that guides the fishing line according to the rotation of the spool 3 may be provided.

The set plate 13 may be fixed to the frame 2. In one embodiment of the present disclosure, the spool 3 and the set plate 13 may be attached to and detached from the frame 2 by a bayonet structure in which a plurality of claws provided on the lock member is rotated to lock to a holding unit provided on the frame 2; however, they may also be fixed by a method such as screwing or bonding.

When the set plate 13 is fixed to the frame 2, the spool 3 is rotatably and pivotally supported. The fixed magnet 5 and the rotating magnet 6 are held by the set plate 13 to form a braking force generation unit (braking force generation means) 20 to be described later. A side plate unit may be formed by integrating the set plate 13, the inner lid 15, and the outer lid 21. A watertight chamber is formed of the inner lid 15 and the outer lid 21, and electric parts such as the board 19, the battery 18, the motor 16, and the sensor are housed in the watertight chamber.

Next, a generation principle of the braking force and a method of adjusting the braking force are described mainly with reference to FIG. 3. Note that, in one embodiment of the present disclosure, it is described using a method of applying braking torque to the spool by an eddy current, but various methods other than this method may also be considered. An annular rotator-shaped braked unit (induct rotor) 4 formed of a nonmagnetic conductor such as aluminum or copper is attached to the spool 3. A cylindrical rotating magnet 6 is arranged on an outer peripheral side of the induct rotor 4, and a cylindrical fixed magnet 5 is arranged on an inner peripheral side thereof.

An outer peripheral portion of the fixed magnet 5 is divided into N equal parts, and alternately magnetized to N poles and S poles. An inner peripheral portion of the rotating magnet 6 is divided into N equal parts, and alternately magnetized to N poles and S poles. A magnetic field created by the fixed magnet 5 and the rotating magnet 6 penetrates the induct rotor 4 (also referred to as an eddy current generation plate) located therebetween. Therefore, when the spool rotates, an eddy current is generated in the induct rotor 4, and the braking torque according to the rotational speed acts. Magnitude of the braking torque is proportional to intensity of the magnetic field and the rotational speed.

As a result, the braking force generation unit (braking force generation means) 20 of one embodiment of the present disclosure is realized. Note that, it is also possible to use a mechanism of changing a facing area of the magnet and the induct rotor by making the induct rotor 4 movable in an axial direction by balance between a centrifugal force and a spring force, thereby adjusting a relationship between the rotational speed and the braking force.

The rotating magnet 6 is fixed to a rotating magnet holder 22 and is rotatably supported with respect to the set plate 13. The rotating magnet holder 22 includes a gear unit, and receives transmission of a force from the motor via the reduction gear 17. A position sensor 24 may transmit a voltage signal corresponding to a position of the rotating magnet 6 to a control unit. In one embodiment of the present disclosure, this is realized by detecting an angular position of a part of the gear forming the gear unit by volume, but other known means such as detecting an angle of the rotating magnet 6 by a magnetic sensor may also be used.

A clutch state detection unit (clutch state detection means) 31 that detects a state of the clutch means is provided, and it is regarded that casting preparation is performed when the clutch switches from an engaged state to a disengaged state. A motor driver 25 supplies predetermined electric power to the motor 16 to rotate the motor 16. A braking force control unit (braking force control means) 30 feedback-controls the rotating magnet 6 to a predetermined position by rotating the motor 16 forward and backward by the motor driver 25 on the basis of the signal from the position sensor 24. In this manner, the magnetic field acting on the braked unit 4 may be set to predetermined magnitude.

The magnetic field acting on the braked member 4 is minimized when the same poles of the rotating magnet 6 and the fixed magnet 5 face each other, and is maximized when different poles face each other. When the rotating magnet 6 is rotated from homopolar facing to heteropolar facing, the magnetic field acting on the braked member 4 increases substantially in proportion to an angle movement amount.

Figure 6:
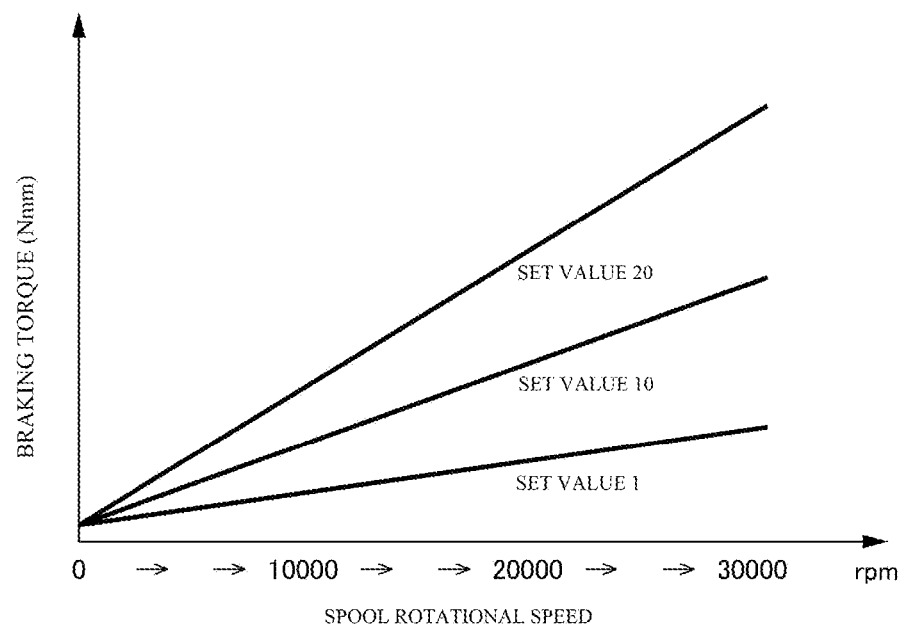
FIG. 6 is a view for illustrating a relationship between the spool rotational speed and braking torque by the braking force control device according to one embodiment of the present disclosure.

Hereinafter, a homopolar facing state is defined as a brake set value 1, and a heteropolar facing state is defined as a brake set value 20. Therefore, the braking torque acting on the spool 3 increases substantially in proportion to the brake set value. A relationship between the braking torque acting on the spool 3, the speed of the spool 3, and the brake set value is illustrated in FIG. 6. As illustrated, it is understood that the braking torque increases in proportion to the spool rotational speed and the brake set value. The braking force control unit 30 may apply a desired braking force to the spool 3 by moving the rotating magnet to a predetermined position by the motor 16.

Next, a rotational speed detection means (in the example illustrated in FIG. 3, a spool rotation sensor 26) that detects the rotational speed of the spool 3 is described. In one embodiment of the present disclosure, the rotational speed is detected using a known incremental rotary encoder that outputs a pulse signal of a predetermined number each time the spool makes one rotation. That is, the reflector 12 attached to the spool is equally divided into N parts, and surfaces thereof are alternately painted in bright and dark colors to change reflectance. A bright portion is a metal surface or is painted in white. A dark portion is subjected to surface treatment with low reflectance such as painting in black.

By arranging two reflective photosensors at positions facing the reflector 12, it is possible to detect bright and dark colors of the surfaces facing the respective photosensors. As a result, the rotation of the spool 3 may be detected. In one embodiment of the present disclosure, a bright and dark interval of the reflector 12 is set to 180°, and the two photosensors are arranged at 90°. As a result, a four-pulse signal is output each time the spool 3 makes one rotation.

As the incremental rotary encoder, a similar effect may be realized by using a transmissive photosensor or a magnetic sensor in addition to the reflective photosensor as described above. A rotational amount of the spool may be calculated on the basis the number of pulses of the rotary encoder. The rotational speed of the spool may be detected by calculating a change in the number of pulses per time. Note that, the rotational speed detection means is not limited to this method, and other conventionally known means may be used. As described above, by using a non-contact type rotational speed detection means that does not come into contact with the spool, it is possible to avoid generation of unnecessary frictional resistance in the spool.

A braking force control device according to one embodiment of the present disclosure is a braking force control device provided with a spool pivotally supported by a reel body, the spool on which a fishing line may be wound, a rotational speed detection unit that detects a rotational speed of the spool, a braking unit that generates a braking force to the spool, and a braking force control unit that controls the braking force of the braking unit, in which the braking force control unit adjusts the braking force according to elapsed time from when casting starts or detection information of the rotational speed detection unit.

According to the braking force control device according to one embodiment of the present disclosure, it becomes possible to provide the braking force control device capable of achieving both backlash prevention and flying distance improvement without monitoring acceleration. Especially, since the braking force control device according to one embodiment of the present disclosure is not required to calculate the acceleration and tension, this is resistant to noise occurring when detecting the speed, and due to feedforward control of determining a brake set value by a brake speed, this does not oscillate and may reduce a calculation load.

In the braking force control device according to one embodiment of the present disclosure, the braking force control unit controls the braking force on the basis of a brake set value defined for each time during first time of casting, and controls the braking force on the basis of a brake set value defined on the basis of the rotational speed of the spool during second time of the casting. In this manner, it becomes possible to exert an appropriate braking force without the need to obtain the acceleration in the first time in which a change in acceleration is large and in the second time in which the speed is gradually reduced.

In the braking force control device according to one embodiment of the present disclosure, the brake set value of the first time of the casting and the brake set value of the second time of the casting may be individually set and changed. In this manner, it is possible to individually set the braking force in the first time in which an optimal value of the braking torque depends on a factor having a large individual difference such as a manner of swinging the fishing rod and the second time in which this depends on a factor having a small individual difference such as the air resistance. This makes it possible to easily optimize the braking force.

In the braking force control device according to one embodiment of the present disclosure, the braking unit generates the braking force that increases in proportion to an angular speed of the spool, and the braking force control unit controls a proportional coefficient in a changeable manner. Herein, the term of "proportional" includes not only a case of being mathematically proportional but also a case of being equated with proportional (substantially proportional). The term of "substantial proportion" is intended to mean a case where a value of n is near 1, for example, in a range from 0.5 to 1.5 when a relationship between B (a braking force set value) and ω (the angular speed of the spool) is set to $B=k\omega^n$ and approximated by a least squares method and the like. In this manner, since the change in speed of the thrown object such as the lure and the change in speed of the spool may be made substantially the same, the braking force may be optimized by the feedforward control.

In the braking force control device according to one embodiment of the present disclosure, the braking unit is provided with a conductive member provided on the spool, a magnetic force generation unit provided on the reel body, and a magnetic field adjustment unit that changes a magnetic field state of the magnetic force generation unit.

In the braking force control device according to one embodiment of the present disclosure, the conductive member is an induct rotor, the magnetic force generation unit is a permanent magnet, and the magnetic field adjustment unit is a motor and a decelerator.

In the braking force control device according to one embodiment of the present disclosure, the braking force control unit controls such that intensity of a magnetic field acting on the conductive member is proportional to the rotational speed of the spool.

In the braking force control device according to one embodiment of the present disclosure, the braking unit is provided with a brake plate provided on the spool and magneto-rheological fluid in contact with the brake plate, and the braking force control unit is provided with a magnetic field adjustment unit that adjusts a magnetic field acting on the magneto-rheological fluid.

A fishing reel according to one embodiment of the present disclosure includes any of the braking force control device described above. In this manner, the fishing reel according to one embodiment of the present disclosure may provide the fishing reel provided with the braking force control device capable of achieving both backlash prevention and flying distance improvement without monitoring acceleration. Especially, since the braking force control device according to one embodiment of the present disclosure is not required to calculate the acceleration and tension, this is resistant to noise occurring when detecting the speed, and due to feedforward control of determining a brake set value by a brake speed, this does not oscillate and may reduce a calculation load.

In general, the feedback control has advantages that this is more resistant to disturbance and may easily perform optimum setting as compared with the feedforward control. In a conventional braking force control device using the feedback control, angular acceleration is used as a monitoring target as described above. However, there is limitation in accuracy of obtaining the angular acceleration and a response speed, and especially, a weight of the thrown object such as the lure is often on the order of several grams, so that the angular acceleration needs to have accuracy corresponding to a weight of several grams. Therefore, in the feedback control in which the angular acceleration is to be monitored, when the accuracy of obtaining the angular acceleration or responsiveness is insufficient, there is a disadvantage that it is difficult to perform the optimum setting of the braking force, or an influence of oscillation is received and a calculation load increases. In one embodiment of the present disclosure, in the above-described manner, it is possible to determine a characteristic of the braking device after the braking force required at the time of casting is grasped in advance. As a result, it becomes not necessary to use the feedback, so that there is a technical effect that the influence of oscillation may be avoided and the calculation load may be reduced.

Figure 7:
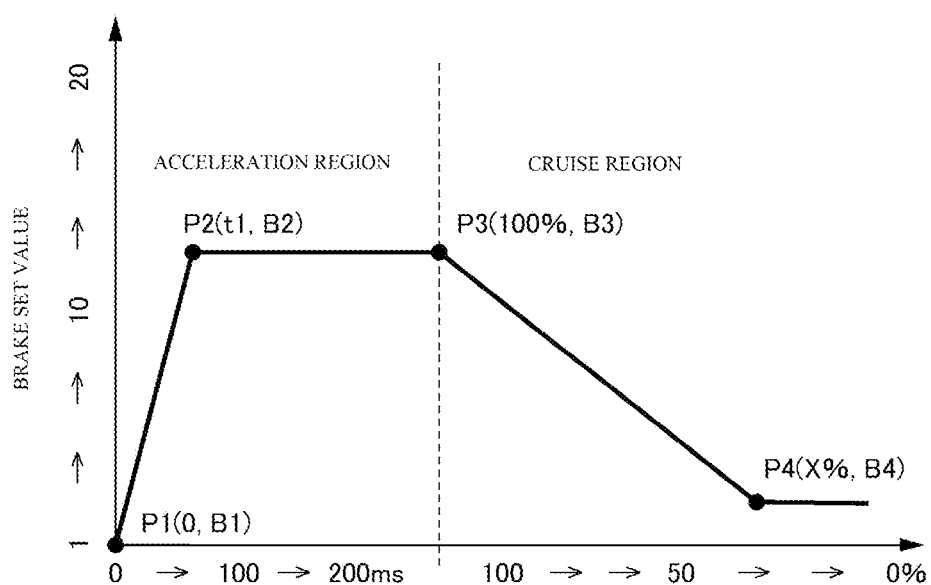
FIG. 7 is a view for illustrating a relationship between elapsed time and a brake set value by the braking force control device according to one embodiment of the present disclosure.

Next, a control method by the braking force control device according to one embodiment of the present disclosure is described in further detail with reference to FIGS. 7 to 9. FIG. 7 illustrates an example of the braking force set value set by the user. The brake set value in the acceleration region is set on a left side in the drawing, and the brake set value in the cruise region is set on a right side.

In one embodiment of the present disclosure, in the acceleration region, the brake set value is determined according to the elapsed time from when the casting starts. P1 indicates that a brake set value B1 when the casting starts is set, and P2 indicates that this is changed to a brake set value B2 after an elapse of t1. In the cruise region, the brake set value is determined according to the rotational speed of the spool. P3 indicates that a brake set value B3 when the spool rotational speed is the maximum speed is set, and P4 indicates that a brake set value B4 when the spool rotational speed is X % or less of the maximum speed is set. In this embodiment, the brake set value between P3 and P4 (between X % and 100% of the maximum spool speed) is set to linearly change between the brake set values B3 and B4.

Figure 8:
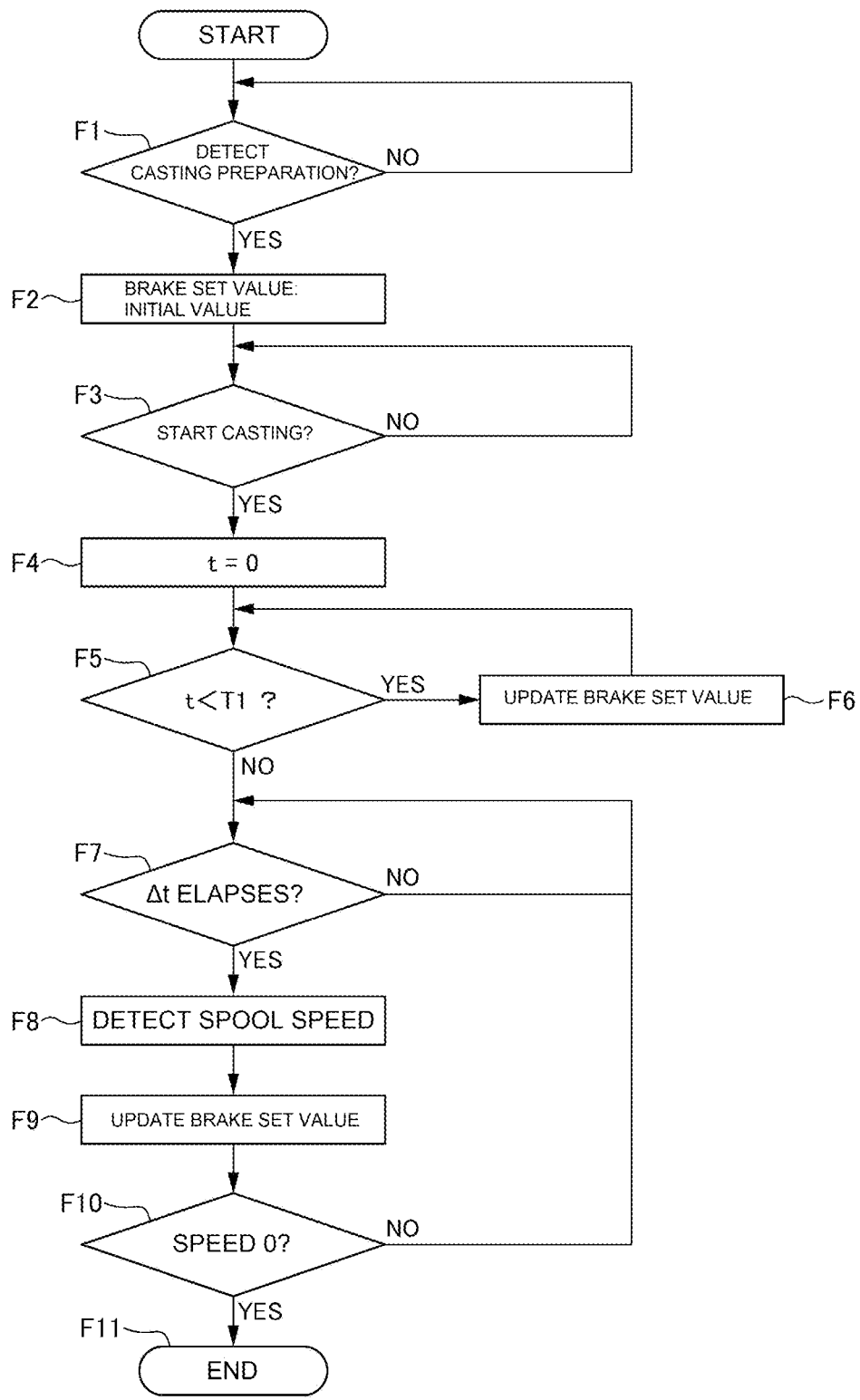
FIG. 8 is a view for illustrating a flowchart of a control method by the braking force control device according to one embodiment of the present disclosure.

Next, FIG. 8 is a flowchart for describing the control method by the braking force control device according to one embodiment of the present disclosure. When the braking force control device 100 according to one embodiment of the present disclosure detects casting (casting) preparation (step F1), this changes the brake set value to an initial state (step F2). One embodiment of the present disclosure is provided with the clutch state detection unit (clutch state detection means) 31 that detects the state of the clutch means, and it is regarded that the casting preparation is performed when the clutch switches from the engaged state to the disengaged state.

As another method of detecting the casting preparation, the casting (casting) preparation may be detected also by a case where rotation in a fishing line feeding direction starts from a state in which the spool is stopped, a case where the fishing rod is in a predetermined posture such as facing in a specific direction, a case where the angular speed of the reel 1 in a predetermined direction is a set threshold or larger or the like. As an initial state of the brake set value, the set value B1 at a point 1 in FIG. 7 is used.

When it is detected that the rotational speed of the spool obtained by the spool rotation sensor 26 exceeds a predetermined value, it is regarded that the casting (casting) starts (step F3). At that time, a timer is initialized to 0 (step F4). In a case where elapsed time t from when the casting (casting) starts is shorter than a predetermined value T1 (step F5), it is regarded to be in the acceleration region. In this region, the brake set value is changed with time regardless of the spool speed (step F6). The brake set value at that time may be determined by a function represented by a curve P1-P2-P3 on the acceleration region in FIG. 7.

When the elapsed time t from when the casting (casting) starts becomes the predetermined value T1 or longer, the control device regards that it transits to the cruise state. The predetermined value T1 is, for example, in a range of 200 to 500 ms. In this state, the brake set value is changed according to the change in speed. In this region, each time predetermined time Δt elapses with the timer (step F7), the rotational speed of the spool is obtained (step F8). Accordingly, the control circuit calculates a target brake set value on the basis of the setting determined by a function represented by a curve P3-P4 on the cruise region in FIG. 7, and drives the motor to move the rotating magnet to a predetermined position (step F9). When the spool rotational speed becomes a predetermined value (in the example illustrated in FIG. 8, speed 0) or lower (step F10), it is regarded that the casting is finished, and it stands by until next casting (casting) starts (step F11).

Figure 9:
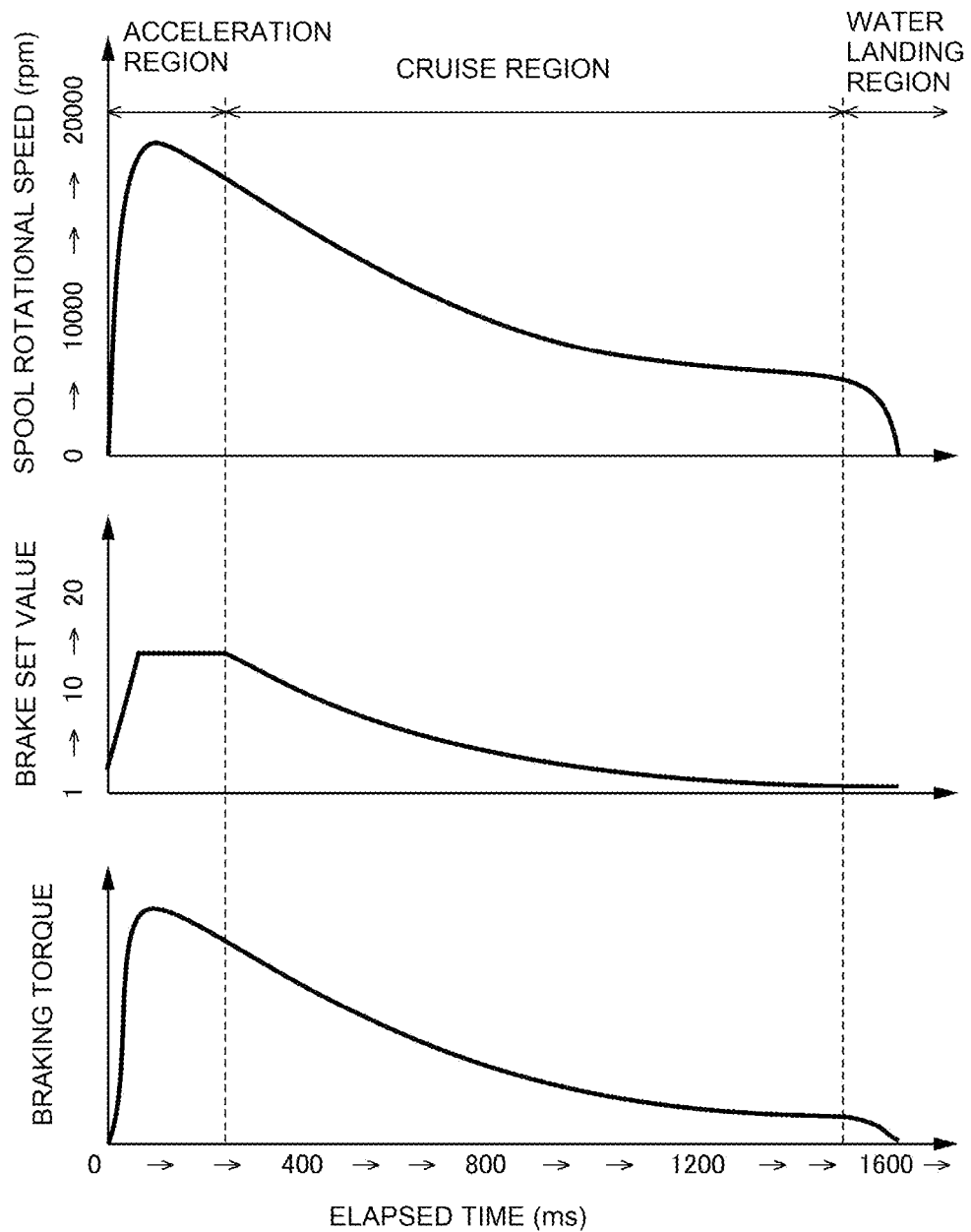
FIG. 9 is a view for illustrating a relationship between the elapsed time, the spool rotational speed and the like by the braking force control device according to one embodiment of the present disclosure.

FIG. 9 illustrates an example of a casting result, in which the elapsed time from when the casting starts is plotted along the abscissa. A change in rotational speed of the spool, a change in brake set value, and a change in braking torque acting on the spool are plotted along the ordinate. As illustrated at the center, in the acceleration region, the brake set value is changed according to the elapsed time. Similarly, in the cruise region, the brake set value is reduced as the spool rotational speed is reduced. As a result, as illustrated in a lower part, the braking torque in a latter half of the casting is reduced, which is effective in improving the flying distance. In the latter half of the cruise region, as illustrated in an upper part, the spool rotational speed and the lure speed are also reduced, and the diameter of the line wound on the spool is also reduced, so that backlash is less likely to occur even if the braking torque is reduced.

As described above, the braking torque in the acceleration region and the braking torque while the spool speed is gradually reduced may be set independently. This makes it possible to achieve both backlash prevention of the fishing line and improvement in casting distance of the lure.

The fishing line always pulls the spool during spool acceleration immediately after the casting (casting), line slag does not occur, and backlash does not occur, so that it is not necessary to apply braking. Backlash is most likely to occur immediately after the spool reaches the maximum speed and then starts to decelerate; to prevent this, it is necessary to apply appropriate braking to the spool at this timing. The optimum value of the braking torque at that time changes depending on a characteristic (length, rigidity, density and the like) of the fishing rod being used, the manner of swinging the fishing rod, a dropping length of the lure before casting, a lure weight, and a lure trajectory. Therefore, individual difference is large. In one embodiment of the present disclosure, the brake set value may be defined for each time in this region. As a result, it is possible to easily reduce the braking force in the time in which it is not necessary to apply braking and sufficiently increase the braking force in the time in which it is necessary to apply braking.

During cruise, the lure is gradually decelerated. This is decelerated mainly by an air resistance force acting on the lure or the fishing line. In most cases, the air resistance during casting becomes a turbulent range and proportional to the square of the lure speed and a frontal projected area. A proportionality coefficient thereof greatly depends on a shape of the lure. In a case where the tension of the fishing line is sufficiently small, the air resistance force is obtained by multiplying the lure weight by the lure deceleration, so that the lure deceleration (change in speed) is proportional to the square of the lure speed. By reducing the rotational speed of the spool to the same extent as (slightly larger than) the change in speed of the lure, it is possible to continue the state in which the fishing line always pulls the spool. That is, the occurrence of line slag may be prevented, and the occurrence of backlash may be prevented.

Therefore, while the lure speed is gradually reduced, the spool may be braked according to the lure shape or the lure weight. Since the optimum value of the braking force at that time does not depend so much on the characteristic of the rod being used and the manner of swinging the rod, there is a little difference depending on individuals and rods. In one embodiment of the present disclosure, the brake set value may be defined on the basis of the rotational speed of the spool in this region. As a result, it is easy to substantially match the change in speed of the lure and the change in speed of the spool, and the brake may be easily optimized.

According to the braking force control device 100 according to one embodiment of the present disclosure, the braking torque at an initial stage of casting and the braking torque during cruise may be set independently. This makes it possible to optimize a braking condition under each condition and to achieve both backlash prevention of the fishing line and improvement in casting distance of the lure. The setting may be changed according to the situation; for example, when the lure is changed, only the setting of the acceleration region is changed, and when a weather condition such as a wind direction is changed, only the setting of the cruise region is changed.

In one embodiment of the present disclosure, as illustrated in FIG. 7, the brake set value is lowered in proportion to the spool rotational speed. The spool braking torque is substantially proportional to the brake set value and spool rotational speed as illustrated in FIG. 6. In this embodiment, as illustrated in FIG. 7, the brake set value increases in proportion to the spool rotational speed. Accordingly, in one embodiment of the present disclosure, the spool braking torque substantially increases in proportion to the square of the spool rotational speed. In a case where the air resistance to the lure increases in proportion to the square of the lure speed as described above, the deceleration of the spool and the deceleration of the lure may be synchronized by setting in this manner, and the braking condition may be easily optimized.

A winding radius of the fishing line wound on the spool is reduced according to the number of rotations of the spool. A speed v at which the fishing line is released from the spool is obtained by multiplying a rotational speed ω of the spool by a winding radius r of the fishing line. Therefore, when the radius r becomes small as the line is released, a change in rotational speed Δω becomes relatively small with respect to a change in speed Δv of the fishing line. That is, when it flies to a far side, a required braking force becomes smaller than that when it flies to a near side. This influence is strong under conditions where a change amount of the winding radius of the fishing line becomes large; such as when a width of the spool is narrow or when a diameter of the fishing line is large. In order to correct this influence, the brake set value may be changed according to the spool rotational speed.

Figure 10A:
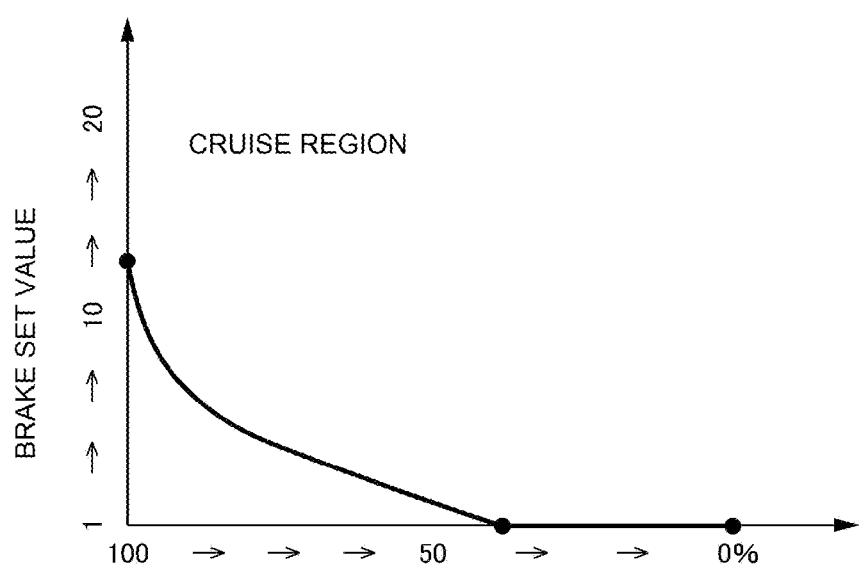
FIGS. 10A and 10B are views for illustrating a relationship between a change in spool rotational speed and the brake set value by the braking force control device according to one embodiment of the present disclosure.
Figure 10B:
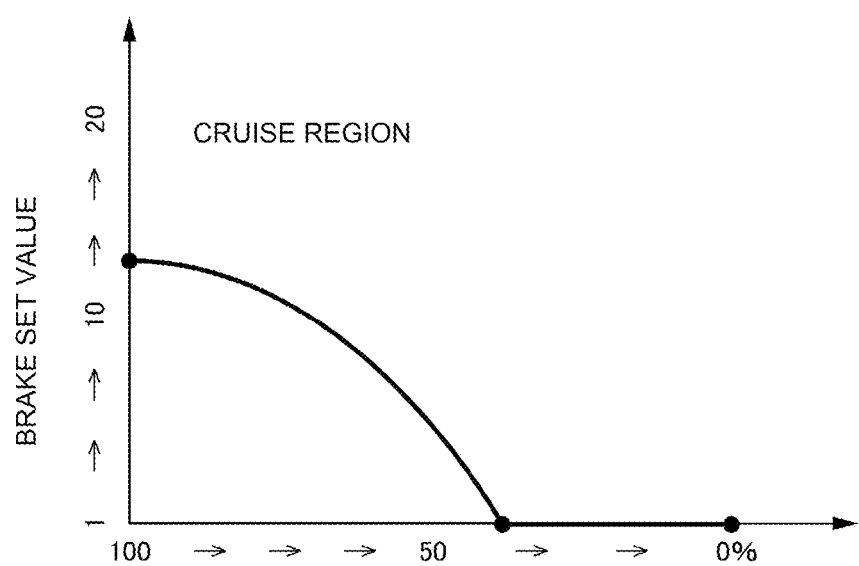

Note that, depending on the shape of the lure and the flying speed, the air resistance might not increase in proportion to the square of the lure speed. Furthermore, since it is affected by acceleration/deceleration by the gravity depending on the flight trajectory of the lure, it is not always optimal to lower the brake set value in proportion to the spool rotational speed as illustrated in FIG. 7. Under such a condition, as illustrated in FIGS. 10A and 10B, it is possible to adjust a relationship between the spool rotational speed and the braking torque by changing by a curve in which the brake set value is convex upward or a curve in which this is convex downward with respect to a change in spool rotational speed. In this manner, arbitrary braking torque may be applied to the lure during cruise.

As a situation in which the user changes the brake setting of the braking force control device 100 according to one embodiment of the present disclosure, there is a case in which the user searches for an optimum condition of the setting taking time in order to extend the casting distance as much as possible, and a case in which it is desired to reduce time and effort required for changing the setting in order to concentrate on fishing.

In one embodiment of the present disclosure, since there is a plurality of parameters of a brake setting condition, it might be difficult to set respective values in the reel body. Therefore, in order to change each parameter (for example, the brake set values at P1 to P4 in FIG. 7) described above, a method of creating a set value by an external information device such as a smartphone and transmitting the same to the control device is effective. As a result, the respective set values may be set independently.

When it is desired to reduce the time and effort required to change the setting, it is desirable that the setting may be made only with the fishing reel without using an external device; however, the fishing reel body often has restriction in space in which the operation means is provided as compared with the external information device. In this case, it is effective to be able to change a part of the above-described parameters by the operation by the fishing reel. For example, in the example in FIG. 7, only a value of the brake set value B2 may be adjusted from the fishing reel while setting the brake set value B2=B3. Then, when the brake set value B2 is changed, the brake set value B3 is also changed. As a result, rough adjustment may be performed while reducing the time and effort required to change the setting.

The braking force control device 100 according to one embodiment of the present disclosure uses the braking device that obtains the braking force by generating the eddy current in the braked member provided on the spool, and the braking torque is substantially proportional to the rotational speed of the spool as described above. The deceleration of the lure during the cruise experiences the air resistance force substantially proportional to the square of the speed as described above. Therefore, by reducing the brake set value in proportion to the spool speed, it is possible to substantially synchronize the braking force acting on the spool and the air resistance acting on the lure. In an eddy current type brake, since the braking torque is proportional to the spool angular speed, the braking torque does not significantly deviate from the optimum braking torque even in a case where the brake set value is not changed. Therefore, even if frequency of changing the brake set value is reduced, the braking torque does not deviate from the optimum braking torque, and a technical effect that the calculation load may be reduced is obtained.

As the braking device in which the braking torque is substantially proportional to the spool rotational speed, there is a braking device using viscous resistance of fluid in addition to the eddy current type braking device as described above. As a method of controlling the viscous resistance of the fluid, for example, there is an MR fluid type braking device using MR fluid capable of controlling viscosity by the intensity of the magnetic field, and an effect similar to that of one embodiment of the present disclosure is obtained also by using this.

Other effects of the eddy current type braking device include a power saving effect and a fail-safe effect. In the eddy current type in one embodiment of the present disclosure, the magnetic field is applied to the braked member by the permanent magnet. As a result, even in a case where the control device is deenergized, the braking torque may be applied to the spool. Therefore, even in a case where the control device abnormally stops during casting (casting), backlash of the spool may be suppressed, and fail-safe is realized.

Since the control device only needs to energize the motor only in a case where it is desired to change the brake set value, the power saving may be realized. Furthermore, since the eddy current type braking device is used, the spool braking torque is always proportional to the spool speed. That is, even in a case where the rotating magnet is not moved, when the spool speed is reduced, the braking torque is reduced accordingly. Therefore, even if time Δt for changing the brake set value is changed, a change in time of the braking force acting on the spool does not significantly change. Therefore, the time Δt may be set relatively large, and power consumption of the motor and a calculation load of a microcomputer may be reduced.

As described above, in the braking force control device according to one embodiment of the present disclosure, it is not necessary to obtain the acceleration of the spool. In the braking force control device according to one embodiment of the present disclosure, as described above, the rotational speed of the spool is obtained using the incremental encoder, and the brake set value is determined according to the value. Note that, the acceleration of the spool may also be obtained by differentiating the rotational speed of the spool, that is, by calculating a rotational speed change amount of the spool within predetermined time.

However, since the incremental encoder has discrete data and further requires processing time for performing various calculations, a time interval at which the control device obtains the rotational speed of the spool also becomes discrete. Therefore, a differential value of the rotational speed is susceptible to noise. When smoothing filter processing is performed to avoid this, a time delay occurs. That is, it is generally difficult to obtain acceleration with less noise without time delay, and the calculation load on the microcomputer also increases. Therefore, according to the braking force control device according to one embodiment of the present disclosure, since the braking torque to the spool is determined without obtaining the acceleration of the spool, it is possible to avoid an increase in calculation load on the microcomputer.

Dimensions, materials, and arrangements of the components described in this specification are not limited to those explicitly described in the embodiment, and the components may be modified to have any dimensions, materials, and arrangements that may fall within the scope of the present disclosure. Components not explicitly described in this specification may be added to the described embodiment, or some of the components described in each embodiment may be omitted.

What is claimed is:

1. A braking force control device comprising:
   a spool on which a fishing line may be wound and that is pivotally supported by a reel body,
   a rotational speed detection unit configured to detect a rotational speed of the spool;
   a braking unit configured to generate a braking force that is applied to the spool; and
   a braking force control unit configured to control the braking force of the braking unit,
   wherein the braking force control unit is configured to adjust the braking force according to an elapsed time beginning from when casting starts or according to detection information of the rotational speed detection unit,
   wherein the braking force control unit is configured to control the braking force based on a first brake set value at a first period of casting corresponding to an acceleration region of the casting and based on a second brake set value at a second period of casting corresponding to a cruise region of the casting, and
   wherein the first brake set value and the second brake set value can be individually set and changed.

2. The braking force control device according to claim 1, wherein the braking unit is provided with a conductive member provided on the spool, a magnetic force generation unit provided on the reel body, and a magnetic field adjustment unit that changes a magnetic field state of the magnetic force generation unit.

3. The braking force control device according to claim 2, wherein the conductive member is an induct rotor, the magnetic force generation unit is a permanent magnet, and the magnetic field adjustment unit is a motor and a decelerator.

4. The braking force control device according to claim 2, wherein the braking force control unit is configured to control an intensity of a magnetic field acting on the conductive member so that the intensity is proportional to the rotational speed of the spool.

5. The braking force control device according to claim 1, wherein the braking unit is provided with a brake plate provided on the spool and a magneto-rheological fluid in contact with the brake plate, and the braking force control unit is provided with a magnetic field adjustment unit that adjusts a magnetic field acting on the magneto-rheological fluid.

6. A fishing reel comprising:
   the braking force control device according to claim 1.

* * * * *